(12) United States Patent
Kim et al.

(10) Patent No.: US 10,721,760 B2
(45) Date of Patent: Jul. 21, 2020

(54) METHOD OF TRANSMITTING AND RECEIVING DATA IN WIRELESS COMMUNICATION SYSTEM AND APPARATUS THEREFOR

(71) Applicant: LG Electronics Inc., Seoul (KR)

(72) Inventors: Hyungtae Kim, Seoul (KR); Jiwon Kang, Seoul (KR); Kijun Kim, Seoul (KR); Changhwan Park, Seoul (KR); Sukhyon Yoon, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/316,571

(22) PCT Filed: Jul. 23, 2018

(86) PCT No.: PCT/KR2018/008282
§ 371 (c)(1),
(2) Date: Jan. 9, 2019

(87) PCT Pub. No.: WO2019/022456
PCT Pub. Date: Jan. 31, 2019

(65) Prior Publication Data
US 2020/0146035 A1 May 7, 2020

Related U.S. Application Data

(60) Provisional application No. 62/566,455, filed on Oct. 1, 2017, provisional application No. 62/555,653, filed (Continued)

(51) Int. Cl.
*H04W 72/12* (2009.01)
*H04L 5/00* (2006.01)

(52) U.S. Cl.
CPC ....... *H04W 72/1273* (2013.01); *H04L 5/0039* (2013.01); *H04L 5/0044* (2013.01); *H04L 5/0092* (2013.01); *H04W 72/1289* (2013.01)

(58) Field of Classification Search
CPC .......... H04W 72/1273; H04W 72/1289; H04L 5/0092; H04L 5/0039; H04L 5/0044
See application file for complete search history.

(56) References Cited

U.S. PATENT DOCUMENTS

2011/0170498 A1\* 7/2011 Liu et al.
2016/0227520 A1\* 8/2016 Davydov et al.

FOREIGN PATENT DOCUMENTS

KR 1020160039639 4/2016
WO WO2017014549 1/2017

OTHER PUBLICATIONS

Xinwei, "Summary of Issues on DL PRB bundling", R1-1711780, 3GPP TSG RAN WG1 NR Ad hoc #2, Qingdao, China, dated May 27-30, 2017, 3 pages.

(Continued)

*Primary Examiner* — Afshawn M Towfighi
(74) *Attorney, Agent, or Firm* — Fish & Richardson P.C.

(57) ABSTRACT

This specification provides a method of transmitting and receiving data in a wireless communication system and an apparatus therefor. Specifically, a method for transmitting and receiving data in a wireless communication system by a user equipment includes receiving downlink control information from a base station and receiving downlink data from the base station through a downlink shared channel configured based on the downlink control information, wherein when the downlink data is broadcasted, a bundling size for the downlink shared channel is configured as a pre-defined value.

11 Claims, 5 Drawing Sheets

Related U.S. Application Data on Sep. 8, 2017, provisional application No. 62/535,949, filed on Jul. 23, 2017.

(56) References Cited

OTHER PUBLICATIONS

LG Electronics, Qualcomm, [Nokia, Ericsson, Panasonic, NTT DOCOMO, ZTE], "WF on DL DMRS for broadcast/multicast PDSCH", R1-1711770, 3GPP TSG RAN WG1 NR Ad-Hoc#2, Qingdao, P.R. China, dated Jun. 27-30, 2017, 3 pages.
InterDigital Inc., "PRG Size Indication in NR", R1-1710922, 3GPP TSG RAN WG1 NR Ad-Hoc#2, Qingdao, P.R. China, dated Jun. 27-30, 2017, 6 pages.
Samsung, "PRB bundling for NR DMRS", R1-1710646, 3GPP TSG RAN WG1 NR Ad-Hoc#2, Qingdao, P.R. China, dated Jun. 27-30, 2017, 7 pages.
Huawei, HiSilicon, "PRB bundling size for DL data precoding", R1-1708133, 3GPP TSG RAN WG1 Meeting #89, Hangzhou, China, dated May 15-19, 2017, 10 pages.

\* cited by examiner

[FIG. 1]
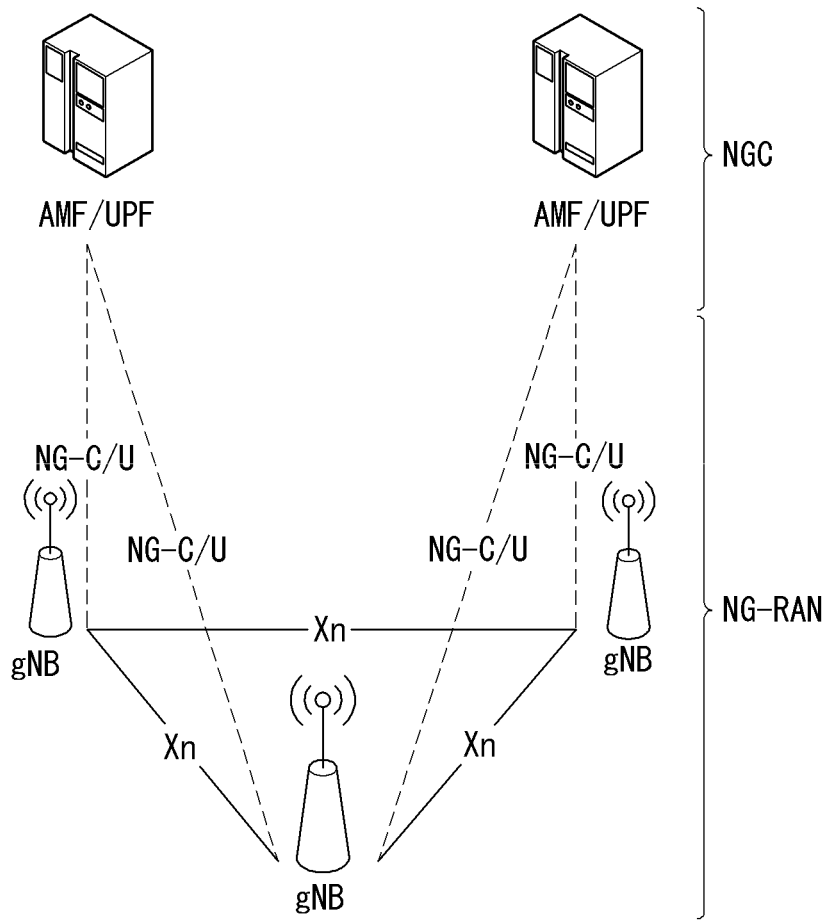
[FIG. 2]
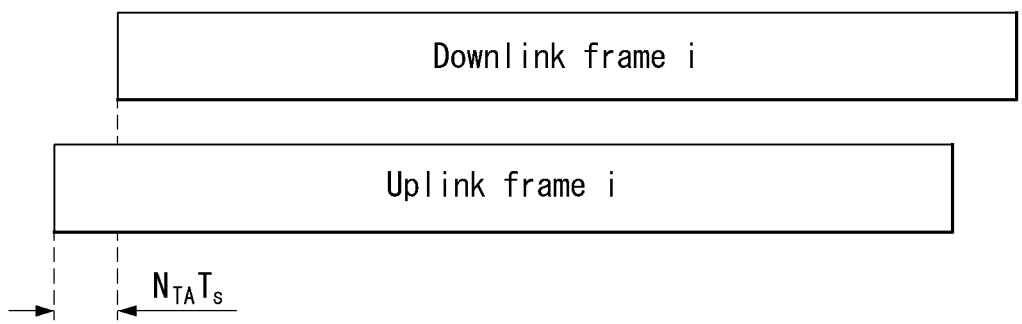

[FIG.3]
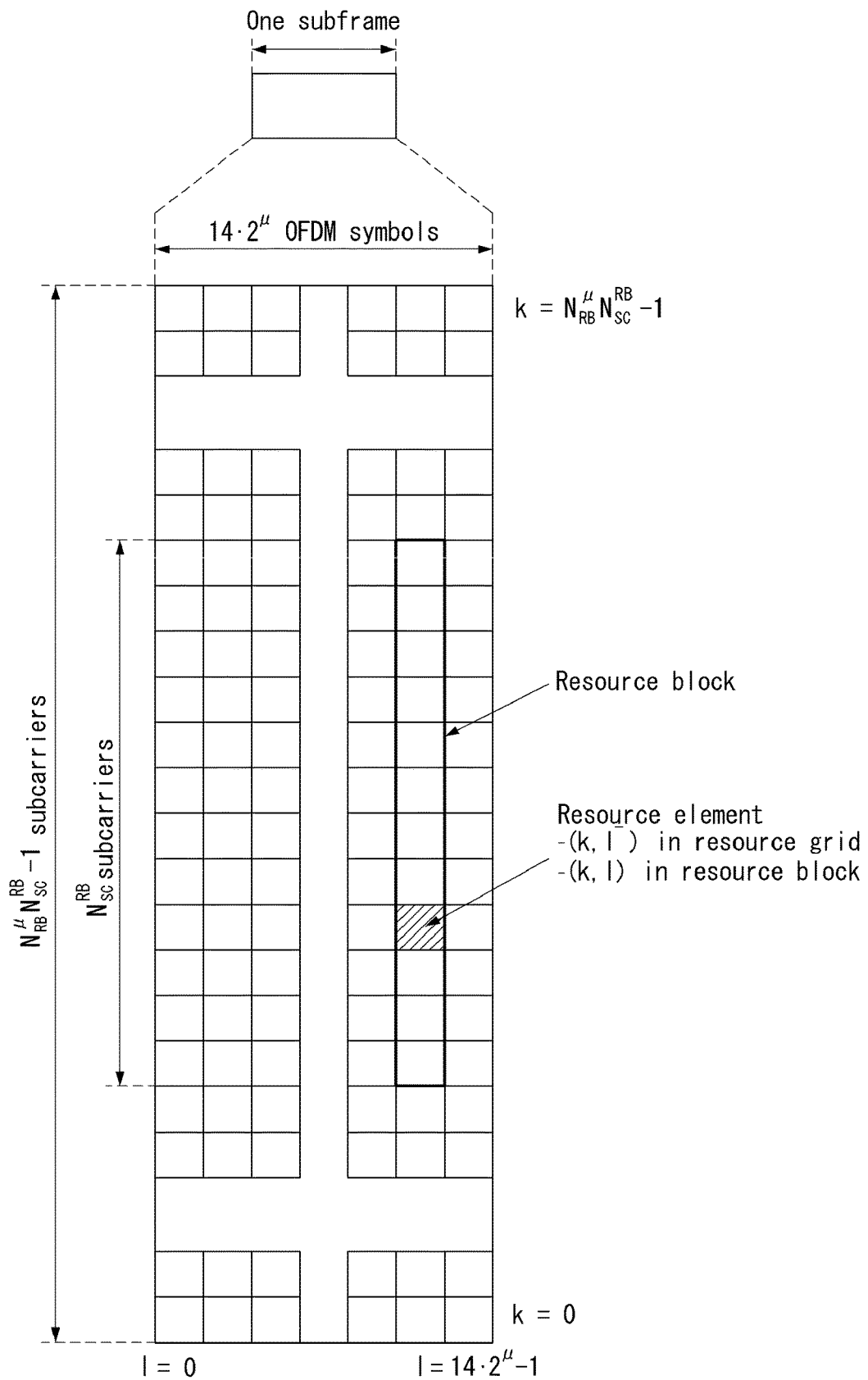

[FIG.4]
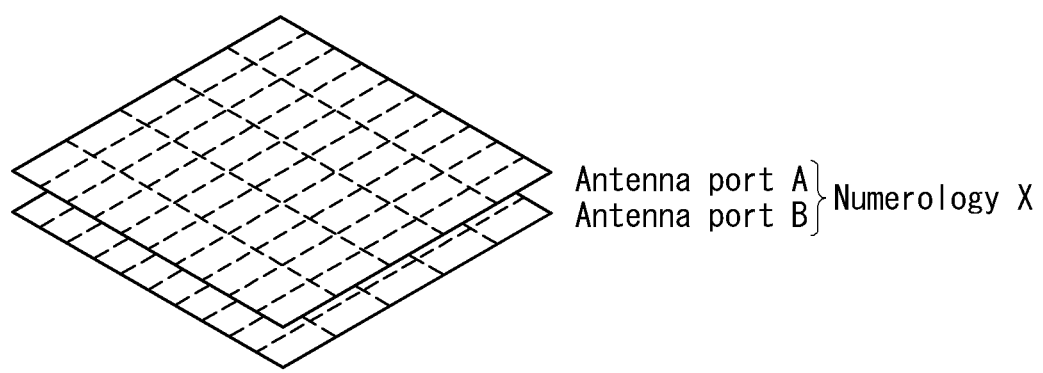
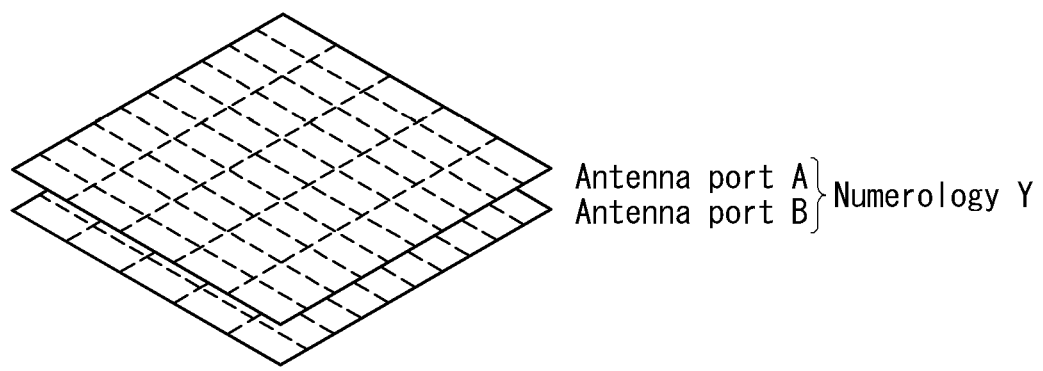

[FIG.5]
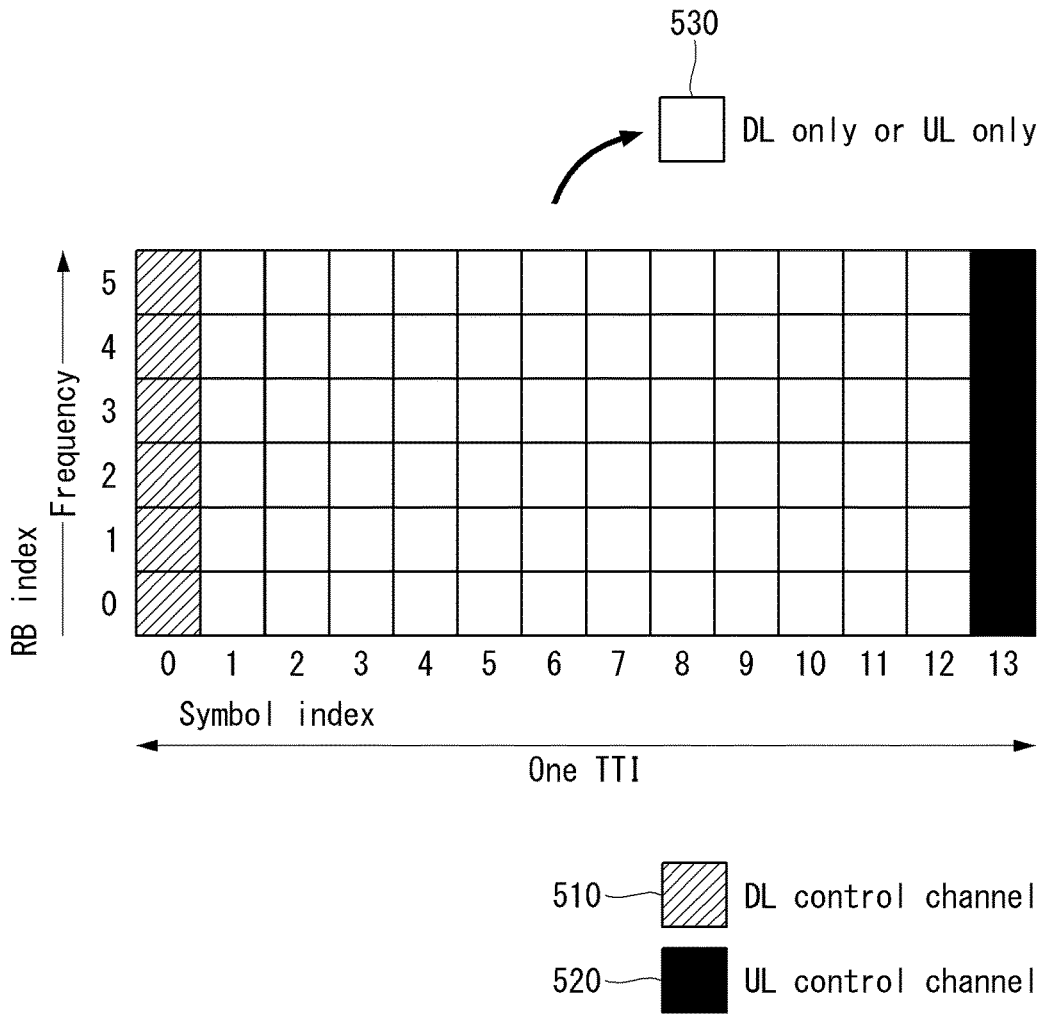
[FIG.6]
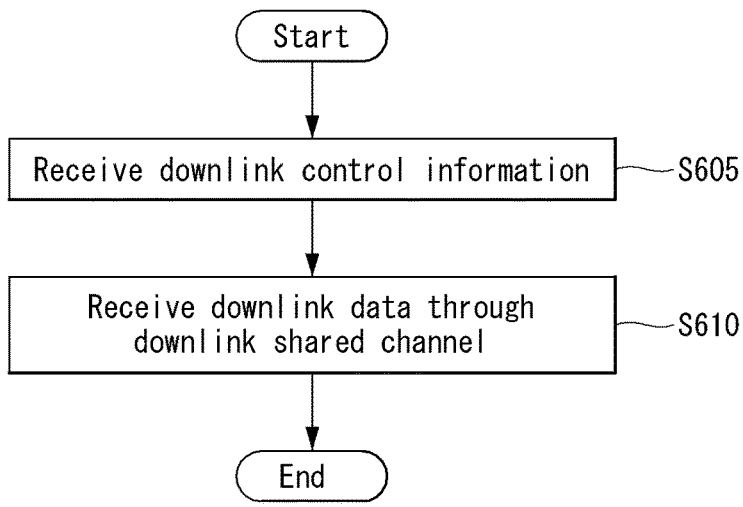

[FIG.7]
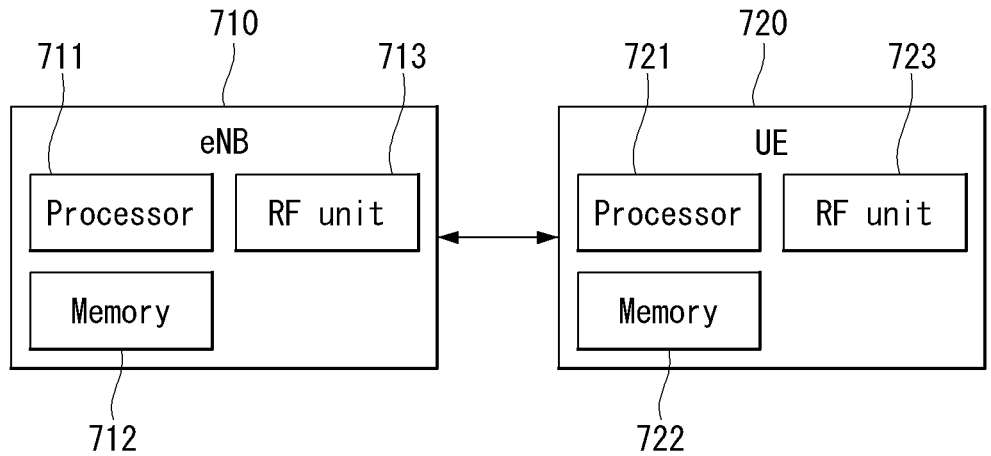
[FIG.8]
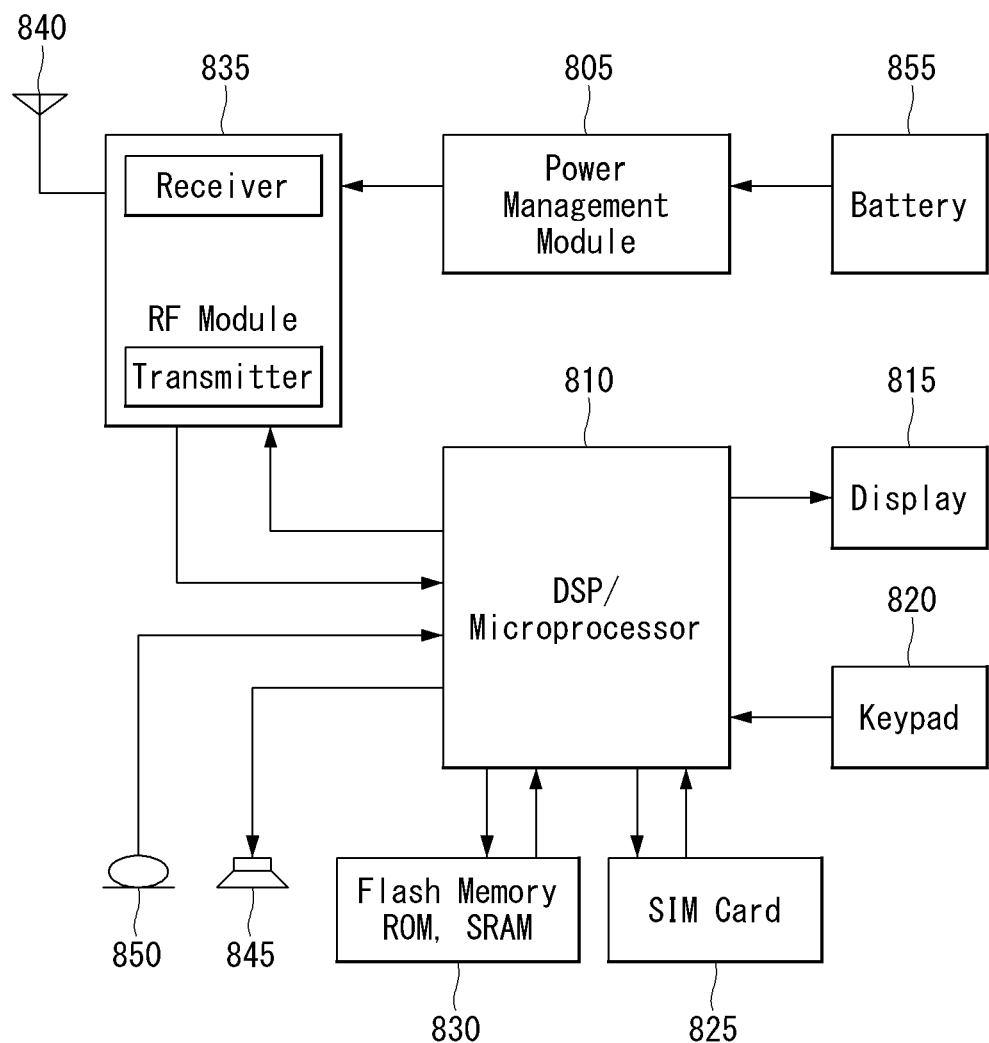

METHOD OF TRANSMITTING AND RECEIVING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/008282, filed on Jul. 23, 2018, which claims the benefit of U.S. Provisional Application No. 62/535,949, filed on Jul. 23, 2017, U.S. Provisional Application No. 62/555,653, filed on Sep. 8, 2017, and U.S. Provisional Application No. 62/566,455, filed on Oct. 1, 2017. The disclosures of the prior applications are incorporated by reference in their entirety.

TECHNICAL FIELD

The present invention relates to a wireless communication system and, more particularly, to a method for transmitting and receiving data and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method of transmitting and receiving data in a wireless communication system and an apparatus therefor.

In relation to the proposal, this specification proposes a method for configuring bundling for a downlink shared channel (e.g., PDSCH) and an apparatus therefor.

Specifically, this specification proposes a method for configuring and indicting a bundling size set, bundling size and/or bundling type for a downlink shared channel and an apparatus therefor.

Technical objects to be achieved in the present invention are not limited to the above-described technical objects, and other technical objects not described above may be evidently understood by a person having ordinary skill in the art to which the present invention pertains from the following description.

Technical Solution

In a method for transmitting and receiving data in a wireless communication system by a user equipment according to an embodiment of the present invention, the method includes receiving, from a base station, downlink control information and receiving, from the base station, downlink data through a downlink shared channel configured based on the downlink control information, wherein, when the downlink data is broadcasted, a bundling size for the downlink shared channel may be configured as a pre-defined value.

In the method according to an embodiment of the present invention, the pre-defined value may be two physical resource blocks (PRBs).

However, in the method, when the downlink data may be not broadcasted, the bundling size for the downlink shared channel may be configured as a specific number of physical resource blocks or the size of a frequency resource region allocated to the user equipment. In this case, a value indicating the specific number of physical resource blocks may be included in a bundling size set which is pre-configured for the downlink shared channel. Furthermore, when the size of the frequency resource region is greater than a value which is pre-configured for the user equipment, the bundling size for the downlink shared channel may be configured as the size of the frequency resource region. The pre-configured value may be configured through higher layer signaling by the base station. Furthermore, the frequency resource region may be configured as physical resource blocks contiguous in a frequency axis.

Furthermore, the pre-configured bundling size set may be configured based on the size of the frequency resource region.

Furthermore, when the downlink data is broadcasted, the downlink data may include a system information block for the user equipment.

In a user equipment transmitting and receiving data in a wireless communication system according to an embodiment of the present invention, the user equipment includes a radio frequency (RF) module for transmitting and receiving radio signals and a processor functionally connected to the RF module. The processor may be configured to receive, from a base station, downlink control information and receive, from a base station, downlink data through a downlink shared channel configured based on the downlink control information. When the downlink data is broadcasted, a bundling size for the downlink shared channel may be configured as a pre-defined value.

In the user equipment according to an embodiment of the present invention, the pre-defined value may be two physical resource blocks (PRBs).

However, in the user equipment, when the downlink data is not broadcasted, the bundling size for the downlink shared channel may be configured as a specific number of physical resource blocks or the size of a frequency resource region allocated to the user equipment. In this case, a value indicating the specific number of physical resource blocks may be included in a bundling size set which is pre-configured for the downlink shared channel. Furthermore, when the size of the frequency resource region is greater than a value which is pre-configured for the user equipment, the bundling size for the downlink shared channel may be configured as the size of the frequency resource region. Furthermore, the frequency resource region may be configured as physical resource blocks contiguous in a frequency axis.

Advantageous Effects

In accordance with an embodiment of the present invention, there are effects in that overhead of control information can be reduced and a bundling size can be configured.

Furthermore, in accordance with an embodiment of the present invention, there is an effect in that various bundling sizes can be configured or indicated through only a small amount of control information.

Furthermore, in accordance with an embodiment of the present invention, there is an effect in that an efficient bundling operation can be supported by taking into consideration tradeoff between precoding flexibility and the accuracy of channel estimation.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 is a diagram illustrating an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example of a resource grid supported in a wireless communication system to which a method proposed by the present disclosure may be implemented.

FIG. 4 illustrates examples of resource grids for each antenna port and numerology to which a method proposed in this specification may be applied.

FIG. 5 is a diagram illustrating an example of a self-contained subframe structure in a wireless communication system to which the present disclosure may be implemented.

FIG. 6 illustrates an operational flowchart of a user equipment transmitting and receiving data in a wireless communication system to which a method proposed in this specification may be applied.

FIG. 7 illustrates a block diagram of a wireless communication apparatus according to an embodiment of the present invention.

FIG. 8 illustrates a block diagram of a communication apparatus according to an embodiment of the present invention.

MODE FOR INVENTION

Hereinafter, some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or next generation NB (general NB, gNodeB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | | Slot configuration | | | | |
|---|---|---|---|---|---|---|
| | | 0 | | | 1 | |
| µ | $N_{symb}^\mu$ | $N_{frame}^{slots\mu}$ | $N_{subframe}^{slots\mu}$ | $N_{symb}^\mu$ | $N_{frame}^{slots\mu}$ | $N_{subframe}^{slots\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| µ | $N_{symb}^\mu$ | $N_{frame}^{slots\mu}$ | $N_{subframe}^{slots\mu}$ | $N_{symb}^\mu$ | $N_{frame}^{slots\mu}$ | $N_{subframe}^{slots\mu}$ |
| 0 | 12 | 10 | 1 | 6 | 20 | 2 |
| 1 | 12 | 20 | 2 | 6 | 40 | 4 |

TABLE 3-continued

| | | | Slot configuration | | | |
|---|---|---|---|---|---|---|
| | | 0 | | | 1 | |
| $\mu$ | $N^{\mu}_{symb}$ | $N^{slots\mu}_{frame}$ | $N^{slots\mu}_{subframe}$ | $N^{\mu}_{symb}$ | $N^{slots\mu}_{frame}$ | $N^{slots\mu}_{subframe}$ |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max, \mu}$. The above $N_{RB}^{max, \mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 illustrates examples of resource grids for each antenna port and numerology to which a method proposed in this specification may be applied.

Each element of the resource grid for the numerology μ and the antenna port p is indicated as a resource element, and may be uniquely identified by an index pair (k,l̄). Herein, k=0, . . . , $N_{RB}^{\mu} N_{sc}^{RB}-1$ is an index in the frequency domain, and l̄=0, . . . , $2^{\mu} N_{symb}^{(\mu)}-1$ indicates a location of a symbol in a subframe. To indicate a resource element in a slot, the index pair (k,l̄) is used. Herein l=0, . . . , $N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

[Equation 1]

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: a set of L1/L2 procedures for obtaining and maintaining a set of TRP(s) and/or UE beams which may be used for DL and UL transmission and reception, and includes at least the following contents:

Beam determination: an operation for a TRP(s) or a UE to select its own transmission/reception beam.

Beam measurement: an operation for a TRP(s) or a UE to measure the characteristics of a received beamforming signal.

Beam reporting: an operation for a UE to report information of a beamformed signal based on beam measurement.

Beam sweeping: an operation of covering a space region using beams transmitted and/or received at time intervals according to a predetermined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP reception beam for uplink reception based on the downlink measurement of a UE for one or more Tx beams of the TRP.

A TRP may determine a TRP Tx beam for downlink transmission based on the uplink measurement of the TRP for one or more Rx beams of the TRP.

A Tx/Rx beam correspondence in a UE is maintained when at least one of the followings is satisfied.

A UE may determine a UE Tx beam for uplink transmission based on the downlink measurement of the UE for one or more Rx beams of the UE.

A UE may determine a UE Rx beam for downlink reception based on the indication of a TRP based on uplink measurement for one or more Tx beams.

Capability indication of UE beam correspondence-related information is supported by a TRP.

The following DL L1/L2 beam management procedure is supported within one or multiple TRPs.

P-1: it is used to enable UE measurement for a different TRP Tx beam in order to support the selection of a TRP Tx beam/UE Rx beam(s).

In the case of beamforming in a TRP, in general, intra/inter-TRP Tx beam sweep is included in a different beam set. For beamforming in a UE, it typically includes UE Rx beam sweep from a set of different beams.

P-2: UE measurement for a different TRP Tx beam is used to change an inter/intra-TRP Tx beam(s).

P-3: if a UE uses beamforming, UE measurement for the same TRP Tx beam is used to change a UE Rx beam.

Aperiodic reporting triggered by at least network is supported in the P-1, P-2 and P-3-related operations.

UE measurement based on an RS for beam management (at least CSI-RS) includes K (a total number of beams) beams. A UE reports the measurement results of selected N Tx beams. In this case, N is not essentially a fixed number. A procedure based on an RS for a mobility object is not excluded. Reporting information includes information indicating a measurement quantity for an N beam(s) when at least N<K and N DL transmission beams. In particular, a UE may report CSI-RS resource indicator (CRI) of N' with respect to K'>1 non-zero-power (NZP) CSI-RS resources.

The following higher layer parameters may be configured in a UE for beam management.

N≥1 reporting setting, M≥1 resource setting
Links between reporting setting and resource setting are established in an agreed CSI measurement configuration.
CSI-RS-based P-1 and P-2 are supported as resource and reporting setting.
P-3 may be supported regardless of whether reporting setting is present or not.
Reporting setting including at least the following contents
Information indicating a selected beam
L1 measurement reporting
Time domain operation (e.g., an aperiodic operation, a periodic operation, a semi-persistent operation)
Frequency granularity when several frequency granularities are supported
Resource setting including at least the following content
Time domain operation (e.g., aperiodic operation, periodic operation, semi-persistent operation)
RS type: at least NZP CSI-RS
At least one CSI-RS resource set. Each CSI-RS resource set includes CSI-RS resources (some parameters of the K CSI-RS resources may be the same. For example, a port number, a time domain operation, density and a period)

Furthermore, NR supports the following beam reporting by taking into consideration L groups where L>1.

Information indicating a minimum group
Measurement quantity for an N1 beam (L1 RSRP and CSI reporting support (if a CSI-RS is for CSI acquisition))
Information indicating NI DL transmission beams if applicable Beam reporting based on a group, such as that described above, may be configured in a UE unit. Furthermore, the group-based beam reporting may be turned off in a UE unit (e.g., when L=1 or NI=1).

NR supports that a UE can trigger a mechanism for recovery from a beam failure.

A beam failure event occurs when quality of a beam pair link of an associated control channel is sufficiently low (e.g., a comparison with a threshold value, the timeout of an associated timer). A mechanism for recovery from a beam failure (or obstacle) is triggered when a beam obstacle occurs.

A network explicitly configures a UE having resources for transmitting an UL signal for a recovery object. The configuration of resources is supported at the place where a base station listens from some or all of directions (e.g., random access region).

An UL transmission/resource reporting a beam obstacle may be located at the same time instance as a PRACH (resource orthogonal to a PRACH resource) and at a time instance different from that of a PRACH (configurable with respect to a UE). The transmission of a DL signal is supported so that a UE can monitor a beam in order to identify new potential beams.

NR supports beam management regardless of a beam-related indication. If a beam-related indication is provided, information regarding a UE-side beamforming/reception procedure used for CSI-RS-based measurement may be indicated with respect to the UE through QCL. It is expected that parameters for delay, Doppler, an average gain, etc. used in the LTE system and a spatial parameter for beamforming in a reception stage will be added as QCL parameters to be supported in NR. An angle of arrival-related parameter may be included in the UE Rx beamforming viewpoint and/or angle of departure-related parameters may be included in the base station reception beamforming viewpoint. NR supports the use of the same or different beams in a control channel and corresponding data channel transmission.

For NR-PDCCH transmission supporting the robustness of beam pair link blocking, a UE may configure an NR-PDCCH on M beam pair links at the same time. In this case, a maximum value of M≥1 and M may depend on at least the UE capability.

A UE may be configured to monitor an NR-PDCCH on a different beam pair link(s) in different NR-PDCCH OFDM symbols. A parameter related to a UE Rx beam configuration for monitoring an NR-PDCCH on multiple beam pair links may be configured by higher layer signaling or a MAC CE and/or is taken into consideration in the search space design.

At least NR supports the indication of a spatial QCL assumption between a DL RS antenna port(s) and a DL RS antenna port(s) for the demodulation of a DL control channel. A candidate signaling method for the beam indication of an NR-PDCCH (i.e., a configuration method of monitoring an NR-PDCCH) is MAC CE signaling, RRC signaling, DCI signaling, spec. transparent and/or implicit method, and a combination of those signaling methods.

For the reception of a unicast DL data channel, NR supports the indication of a spatial QCL assumption between a DL RS antenna port and the DMRS antenna port of a DL data channel.

Information indicating an RS antenna port is indicated through DCI (downlink grant). Furthermore, the information indicates an RS antenna port QCLed with a DMRS antenna port. A different set of DMRS antenna ports for a DL data channel may be indicated as QCL with a different set of RS antenna ports.

Hereinafter, prior to detailed description of methods proposed in this specification, contents directly/indirectly related to the methods proposed in this specification are described in brief below.

In next-generation communication, such as 5G, New Rat (NR), as more communication devices require a greater communication capacity, there emerges a need for enhanced mobile broadband communication compared to the existing radio access technology (RAT).

Furthermore, massive machine type communications (MTC) providing various services anywhere and at any time by connecting multiple devices and things is also one of important issues to be taken into consideration in the next-generation communication.

Furthermore, the design or structure of a communication system in which services and/or UEs sensitive to reliability and latency are taken into consideration is also discussed.

As described above, the introduction of a next-generation radio access technology (RAT) in which enhanced mobile broadband (eMBB) communication, massive MTC (mMTC) and ultra-reliable and low latency communication (URLLC) are taken into consideration is now discussed. In this specification, a corresponding technology is commonly called "new RAT(NR)", for convenience sake.

Self-Contained Slot Structure

In order to minimize latency of data transmission in the TDD system, in a 5G New RAT (NR), a self-contained slot structure such as FIG. 5 may be taken into consideration.

That is, FIG. 5 is a diagram showing an example of a self-contained slot structure to which a method proposed in this specification may be applied.

In FIG. 5, a deviant crease line area 510 indicates a downlink (DL) control region and a black portion 520 indicates an uplink (UL) control region.

A portion 530 not having indication may be used for downlink data transmission or uplink data transmission.

The characteristic of such a structure is that DL transmission and UL transmission are sequentially performed within one slot and DL data can be transmitted and UL Ack/Nack can also be transmitted and received within one slot.

Such a slot may be defined as a "self-contained slot."

That is, through such a slot structure, a base station can reduce the time taken to perform data retransmission to a UE when a data transmission error occurs and thus can minimize latency of the final data delivery.

In such a self-contained slot structure, a base station and a UE require a time gap for a process of switching from a transmission mode to a reception mode or a process of switching from the reception mode to the transmission mode.

To this end, in a corresponding slot structure, some OFDM symbols when DL switches to UL are configured as a guard period (GP).

Hereinafter, in this specification, a method of configuring and/or indicating a physical resource block bundling size applied to a downlink shared channel (e.g., a physical downlink shared channel (PDSCH)) in relation to the transmission and reception of downlink data is described below specifically.

PRB bundling may mean an operation of applying the same PMI across a plurality of contiguous resource blocks (i.e., physical resource block (PRB)) when data transmission is performed. In other words, PRB bundling may mean that a UE assumes multiple resource blocks on the frequency domain as one granularity for precoding in order to perform PMI reporting and/or RI reporting.

Furthermore, PRB bundling for a downlink shared channel may mean or refer to demodulation reference signal bundling (DMRS bundling).

In this case, a system bandwidth or bandwidth part (BWP) may be split based on the size (e.g., P' or $P'_{BWP,i}$) of a precoding resource block group (PRG). Each PRG may include contiguous PRBs (or consecutive PRB). That is, a PRB bundling size described in this specification may mean the size of a PRB or a PRG value. Furthermore, a value (i.e., number) indicating a PRB bundling size may mean the number of PRBs for corresponding PRB bundling.

In this case, the setting of the size of PRB bundling needs to be determined by taking into consideration a tradeoff between the flexibility of precoders used in a PRB and quality of channel estimation. Specifically, if the size of PRB bundling is configured very large, a disadvantage of a flexibility aspect may be caused depending on that the same precoder must be used in all PRBs. In contrast, if the size of PRB bundling is configured very small, complexity in channel estimation may increase. Accordingly, to set the size of PRB bundling needs to be efficiently performed by taking into consideration the above-described aspects.

In relation to the transmission of downlink data, in the NR system, the value of a PRB bundling size may be configured according to a method of selecting a specific value of preset values (e.g., 1, 2, 4, 8, 16) as the value of a PRB bundling size (hereinafter, a first method) and/or a method of setting the same value as bandwidth (or PRBs) contiguously scheduled (i.e., allocated) with respect to a corresponding UE on the frequency domain as the value of a PRB bundling size (hereinafter, a second method). In this case, the first method and the second method may be independently applied or the two methods may be mixed and applied.

For example, if a PRB bundling size set is configured as {2, 4, UE allocation band (e.g., wideband)}, a PRB bundling size may be selected (or determined) as any one value of 2 or 4 according to the first method. Alternatively, in this case, the PRB bundling size may be selected as a UE allocation band according to the second method.

In relation to this, in the NR system, a method of indicating a PRB bundling size through a 1-bit value is taken into consideration. However, if only 1-bit information is used, only two PRB bundling sizes can be indicated. Accordingly, in order to indicate or set more PRB bundling sizes, an additional or alternative method needs to be taken into consideration.

In order to configure and/or indicate efficient PRB bundling by taking into consideration the above-described point, in this specification, methods of configuring a PRB bundling size set (hereinafter, first embodiment), methods of configuring a PRB bundling size explicitly or implicitly (hereinafter, first embodiment, second embodiment), methods of selecting an application method for PRB bundling (i.e., first method and second method) (hereinafter, third embodiment), and methods of applying RPB bundling based on a resource allocation type (hereinafter, fourth embodiment) are described.

Furthermore, a method of setting a PRB bundling size by taking into consideration a case where information (e.g., system information block (SIB), random access response (RAR), paging information) on which a downlink shared channel (e.g., PDSCH) is broadcasted is delivered (hereinafter, fifth embodiment) is also described. For example, contents corresponding to the first embodiment to the fourth embodiment independently of the fifth embodiment may be assumed to be applied to common downlink data and/or broadcast downlink data.

Hereinafter, the following embodiments have been distinguished for convenience of description, and some elements or characteristics of an embodiment may be included in another embodiment or may be substituted with elements or characteristics of another embodiment. For example, furthermore, the contents of a PRB bundling size set described in the first embodiment hereinafter may be applied to various embodiments of this specification in common. Furthermore, for the configuration and/or indication of PRB bundling, a method (e.g., a method for common downlink data) described in the first embodiment to the fourth embodiment hereinafter and a method (e.g., a method for broadcast downlink data) described in the fifth embodiment may be applied independently or in combination and vice versa.

First Embodiment

Hereinafter, in the first embodiment, a method of determining or configuring a PRB bundling size set is described in detail. In this case, the PRB bundling size set may mean a set configured (or constructed) with candidate PRB bundling sizes which may be selected as a PRB bundling size. For example, a PRB bundling size set may be configured as {2, 4, UE allocation band, . . . }.

In the present embodiment, by taking into consideration the fact that a PRB bundling size indicator taken into consideration in the NR system has 1 bit, a case where the number of elements of a PRB bundling size set is 2 is assumed. However, the methods described in the present embodiment may also be extended and applied to a case where the PRB bundling size indicator is 1 bit or more and the number of elements of a PRB bundling size set is 2 or more.

Furthermore, the following methods have been distinguished for convenience of description, and some elements or characteristics of a method may be included in another method or may be substituted with elements or characteristics corresponding to another method.

Method 1)

A set configured with two PRB bundling sizes is determined based on a system bandwidth, and a base station may be configured to indicate a PRB bundling size to be applied by a corresponding UE through downlink control information (DCI) using 1 bit. That is, a configuration may be performed so that a PRB bundling size set is determined as {bundling size A, bundling size B} based on a system bandwidth and a PRB bundling size indicator belonging to DCI indicates A or B.

For example, when a system bandwidth is 5 MHz or less, a PRB bundling size set may be configured as {2, 4}. When a system bandwidth is 5 MHz or more to 10 MHz or less, a PRB bundling size set may be configured as {4, 8}. When a system bandwidth is 10 MHz or more, a PRB bundling size set may be configured as {8, 16}. In this case, the two size values defined within the set may be selected through a 1-bit DCI field.

Method 2)

IN the case of the method 1, a PRB bundling size set may be changed based on a system bandwidth. In contrast, a PRB bundling size set may be configured (or changed) based on the receivable and/or transmittable bandwidth of a UE determined based on the radio frequency (RF) capability of the UE. In this case, the receivable and/or transmittable bandwidth is configured with some frequency domain of a system bandwidth, and may mean a frequency domain in which a resource may be allocated to the corresponding UE among the system bandwidth.

That is, a PRB bundling size set may be configured based on a bandwidth in which a UE can actually perform transmission and reception other than a system bandwidth. In this case, the UE may need to previously report such capability information to a base station.

In this specification, such a receivable and/or transmittable bandwidth of a UE is denoted as a UE-specific wideband. That is, the UE-specific wideband may mean a bandwidth on a frequency domain which may be allocated (or scheduled) with respect to a corresponding UE, and may be abbreviated as a "wideband" with respect to the operation of a corresponding UE.

For example, when a UE-specific wideband is 5 MHz or less, a PRB bundling size set may be configured as {2, 4}. When a UE-specific wideband is 5 MHz or more to 10 MHz or less, a PRB bundling size set may be configured as {4, 8}. When a UE-specific wideband is 10 MHz or more, a PRB bundling size set may be configured as {8, 16}. In this case, the two values defined within the set may be selected through a 1-bit DCI field.

Method 3)

The above-described UE-specific wideband may be defined as one or more bandwidth parts (hereinafter, BWP). A base station may configure a single or multiple BWPs in a UE. In this case, the base station may activated or deactivate a single or multiple BWPs of configured BWPs, may notify the UE of this, and may allocate a resource for the corresponding UE to only the active BWP.

A PRB bundling size set may be determined depending on that the size of an active BWP (i.e., corresponding BWP) includes how many RBs (i.e., PRBs) and the frequency bandwidth of a BWP by taking into consideration such a point. For example, when the size of an active BWP is 10 MHz or less, a PRB bundling size set may be configured as {2, 4}. When the size of an active BWP is 10 MHz or more, a PRB bundling size set may be configured as {8, 16}.

If an active BWP is multiple for a UE, a PRB bundling size or a PRB bundling size set may be configured (or determined) independently based on a BWP size for each active BWP. Alternatively, when an active BWP is multiple, a PRB bundling size or a PRB bundling size set may be configured based on the sum of the RB sizes of active BWPs. For example, when a first BWP and a second BWP are active, a PRB bundling size may be determined based on the sum of the RB size of the first BWP and the RB size of the second BWP. For another example, when the sum of BWPs is 10 MHz or less, a PRB bundling size set may be configured as {2, 4}. When the sum of BWPs is 10 MHz or more, a PRB bundling size set may be configured as {8, 16}.

Alternatively, when an active BWP is multiple, a PRB bundling size may be determined based on an average size of the active BWPs, the smallest size value of the active BWPs, the greatest size value of the active BWPs according to the method.

In this case, the two values defined within the set may be selected through a 1-bit DCI field.

Method 4)

In the case of the method 1, a PRB bundling size set may be changed based on a system bandwidth. In contrast, a PRB bundling size set may be changed based on the size of a resource block group (RBG).

For example, when the RBG size is 1 RB, a PRB bundling size may be fixed to 1 RB. When the RBG size is 2 RBs, a PRB bundling size set may be configured as {1, 2}. When the RBG size is 8 RBs, a PRB bundling size set may be configured as {4, 8}. When the RBG size is 16 RBs, a PRB bundling size set may be configured as {8, 16}.

In this case, the two values defined within the set may be selected through a 1-bit DCI field.

Method 5)

In the case of the method 1, a PRB bundling size set may be changed based on a system bandwidth. In contrast, a PRB bundling size set may be changed based on the size of a subband in which a precoding matrix indicator (PMI) (or rank indicator (RI)) is reported or indicated.

For example, when the size of a subband is 1 RB, a PRB bundling size may be fixed to 1 RB. When the size of a subband is 2 RBs, a PRB bundling size set may be configured as {1, 2}. When the size of a subband is 8 RBs, a PRB bundling size set may be configured as {4, 8}. When the size of a subband is 16 RBs, a PRB bundling size set may be configured as {8, 16}.

When a UE reports a subband-based PMI for downlink, it may be preferred that the PRB bundling size of actually transmitted data increases according to the size of a subband because it is assumed that the PMI is not changed within the corresponding subband. Likewise, when a subband-based PMI is indicated through DCI in uplink, it may be preferred that the PRB bundling size of actually transmitted data increases based on the size of a subband because it is assumed that the PMI is not changed within the corresponding subband.

In this case, the two values defined within the set may be selected through a 1-bit DCI field.

Method 6)

Furthermore, a PRB bundling size set may be changed based on the size (e.g., RB) of resources actually allocated to a UE for data transmission.

For example, when a resource allocated to a UE is 10 RBs or less, a PRB bundling size set may be configured as {2, 4}. When a resource allocated to a UE is 10 RBs or more to 20 RBs or less, a PRB bundling size set may be configured as {4, 8}. When a resource allocated to a UE is 20 RBs or more, a PRB bundling size set may be configured as {8, 16}.

In this case, the two values defined within the set may be selected through a 1-bit DCI field.

Method 7)

Furthermore, a PRB bundling size set may be changed based on the number of DMRS (OFDM) symbols. In this case, the number of DMRS symbols means the number of OFDM symbols to which a DMRS is mapped. In this case, the number of DMRS symbols may be configured as 1, 2, 3, 4, etc. in various ways.

When the number of DMRS symbols is small, a PRB bundling size set may be configured with small PRB bundling sizes. When the number of DMRS symbols is large, DMRS density is sufficiently large. Accordingly, a bundling size is configured small in the frequency axis, and thus a base station can obtain a frequency selective gain while finely changing precoding in the frequency axis.

Alternatively, however, when the number of DMRS symbols is large, a PRB bundling size set may be configured with large PRB bundling sizes.

In this case, the two values defined within the set may be selected through a 1-bit DCI field.

Method 8)

Furthermore, a PRB bundling size set may be changed based on a seed value of a DMRS sequence. For example, a PRB bundling size set may be differently defined based on an n scrambling ID (nSCID) or virtual cell ID configuring the seed of a DMRS. In this case, when the nSCIDs are 0 and 1, PRB bundling size sets may be configured with {2, 4} and {8, 16}, respectively.

In this case, the two values defined within the set may be selected through a 1-bit DCI field.

Method 9)

Furthermore, a PRB bundling size set may be changed based on a DMRS configuration. A base station may notify a UE of a DMRS configuration through higher layer signaling (RRC signaling), and may indicate one of a DMRS configuration 1 and a DMRS configuration 2.

For example, PRB bundling size sets may be configured with {2, 4} and {8, 16} with respect to the DMRS configuration 1 and the DMRS configuration 2, respectively. In the case of the DMRS configuration 1, it may be preferred that a set is configured with small PRB bundling sizes because frequency density per port of a DMRS is high. In the case of the DMRS configuration 2, it may be preferred that a set is configured with large PRB bundling sizes.

For more detailed example, a bundling size set may be changed depending on a DMRS configuration Type 1 or a DMRS configuration Type 2. In the case of Type 1, DMRSs maintain a relatively dense interval because they are uniformly disposed per two resource elements (REs). In contrast, in the case of Type 2, DMRSs are not uniformly disposed and DMRS REs are spaced apart at intervals of 3 REs. Accordingly, it may be preferred that a bundling size set is configured as a small bundling size value when Type 1 is used and a bundling size set is configured as a large bundling size value when Type 2 is used.

In this case, the two values defined within the set may be selected through a 1-bit DCI field.

Method 10)

Furthermore, PRB bundling size set may be changed based on the number of DMRS ports configured in a UE through DCI.

The number of DMRS ports is the same as the number of single user (SU) layers. Accordingly, it may mean that if the number of ports increases, the number of layers increases. Assuming that the signal-to-noise ratio (SNR) is fixed, an increase in the number of layers may mean that a multi-path increases. Furthermore, as the multi-path increases, there is a good possibility that the frequency selectivity of a channel may increase. If the frequency selectivity of a channel is large, it may be preferred to obtain a frequency selective gain by configuring a PRB bundling size small.

Accordingly, when the number of DMRS ports configured in a UE is many, a method of setting a PRB bundling size small may be taken into consideration. For example, when the number of DMRS ports is 2 or less, a PRB bundling size set may be configured as {1, 2}. When the number of DMRS ports is 3 or more, a PRB bundling size set may be configured as {2, 4}.

Method 11)

Furthermore, when PRB bundling (i.e., DMRS bundling) is performed in the time axis, a frequency-axis bundling size set may be changed based on a time-axis bundling size. If the time-axis bundling size is large, scheduling flexibility can be increased by configuring the frequency-axis bundling size small because DMRS density indicating the same channel per RB is increased.

For example, if the time-axis bundling size is 1 slot, 2 slots, and 3 slots, frequency-axis bundling size sets may be configured as {8, 16}, {2, 4}, and {1, 2}, respectively.

A PRB bundling size set may be determined through one of the methods and a PRB bundling size may be indicated through DCI within the corresponding set. Additionally, in order to further reduce DCI overhead, a bundling size may be directly determined to be one value without determining the bundling size set through the method. Some contents related to this are described more specifically in the description part of a second embodiment.

Furthermore, a bundling size set or a bundling size may be determined through two or more of the above-described methods. For example, the bundling size set or the bundling size may be determined by a combination of the bundling size (e.g., method 11) and the size of an active BWP (e.g., method 3) on the time domain.

In the above-described method, in order to indicate the bundling size, to use a bundling size indicator through (1-bit) DCI is assumed. In this case, the corresponding DCI may be designed through the following method.

First, one state (i.e., first state indicated by corresponding DCI) may be defined as "PRG=RBG", and the remaining states may be defined as "PRG=k*RBG." In this case, k may be configured through higher layer signaling (e.g., RRC layer signaling, MAC layer signaling) by a base station or may be pre-defined as a specific value.

k may be configured as an integer greater than 1. In this case, the PRB bundling size may be a multiple of a resource allocation minimum unit. In this case, resources concatenated on the frequency axis in an RBG unit among allocated resources may be grouped into k RBGs and subjected to bundling. For example, if k is 2, an RBG is 2 RBs (i.e., PRG=4 RBs), and allocated resources are {RB 1, RB 2, RB 3, RB 4, RB 7, RB 8}, bundling may be applied to {RB 1, RB 2, RB 3, RB 4} and bundling may be applied to {RB 7, RB 8}. However, in this case, the PRG is 4, but an actual bundling size is 4 RBs and two 2-RBs, a receiving stage needs to implement and drive a channel estimator for the two bundling size.

Furthermore, k may be configured as 1/(aliquot of an RBG size). In this case, the RBG may be configured as a multiple of the size of PRB bundling. That is, one RBG may include one or more PRGs. For example, if k is 1/2, an RBG is 4 RBs (i.e., PRG=2 RBs), and allocated resources are {RB 1, RB 2, RB 3, RB 4, RB 7, RB 8, RB 9, RB 10}, bundling may be applied to each of {RB 1, RB 2}, {RB 3, RB 4}, {RB 7, RB 8}, and {RB 9, RB 10}. In this case, since an actual bundling size is always the same as the PRG, a receiving stage may need to implement and drive a channel estimator for one bundling size.

Next, one state may be defined as "PRG=k*RBG", and the remaining states may be defined as "PRG=1PRB." In this case, k may be configured through higher layer signaling (e.g., RRC layer signaling, MAC layer signaling) by a base station or may be pre-defined as a specific value.

In this case, "PRG=1PRB" may mean a configuration for performing precoding cycling for open loop (or semi-open loop) MIMO transmission in a 1 PRB unit. In this case, the precoding cycling may mean an operation of sequentially performing precoding while changing precoders.

Alternatively, if an open loop (or semi-open loop) MIMO transmission scheme has been configured by a base station, a PRG size may be disregarded and a UE may assume "PRG=1PRB."

A set of bundling sizes (i.e., PRB bundling sizes) may be configured or determined through the above-described methods, and a specific bundling size belonging to the set may be indicated through DCI.

Second Embodiment

Unlike in the above-described methods, a PRB bundling size (i.e., DMRS bundling size) may be directly determined by a DMRS-related parameter and/or a specific parameter. In this case, there is an effect in that DCI overhead can be reduced because indication by DCI is not performed. In the present embodiment, related methods are described in detail.

Hereinafter, the following embodiments have been distinguished for convenience of description, and some elements or characteristics of an embodiment may be included in another embodiment or may be substituted with elements or characteristics of another embodiment.

Method 1)

A PRB bundling size may be changed (or set) based on the number of DMRS (OFDM) symbols. In this case, the number of DMRS symbols means the number of OFDM symbols to which a DMRS is mapped. In this case, the number of DMRS symbols may be configured as 1, 2, 3, 4 in various ways.

When the number of DMRS symbols is small, a PRB bundling size may have a small value. When the number of DMRS symbols is large, DMRS density is sufficiently increased. Accordingly, a base station can obtain a frequency selective gain by configuring a bundling size small in a frequency axis and finely changing precoding in the frequency axis.

Alternatively, however, if the number of DMRS symbols is large, the PRB bundling size may have a large value.

Method 2)

Furthermore, a PRB bundling size may be changed (or set) based on a seed value of a DMRS sequence. For example, a PRB bundling size set may be differently defined based on an n scrambling ID (nSCID) or a virtual cell ID configuring the seed of a DMRS. In this case, when the nSCIDs are 0 and 1, the PRB bundling sizes may have 2 and 4, respective.

Method 3)

Furthermore, a PRB bundling size may be changed (or set) based on a DMRS configuration. A base station may notify a UE of a DMRS configuration through higher layer signaling, and may indicate one of a DMRS configuration 1 and a DMRS configuration 2.

For example, the PRB bundling sizes may have 2 and 4, respectively, with respect to the DMRS configuration 1 and the DMRS configuration 2. It may be preferred that a small PRB bundling size is configured because frequency density per each port of a DMRS is high in the case of the DMRS configuration 1 and a large PRB bundling size is configured in the case of the DMRS configuration 2 and vice versa.

For more detailed example, a bundling size may be changed based on a DMRS configuration Type 1 or a DMRS configuration Type 2. In the case of Type 1, DMRSs maintain a relatively dense interval because they are uniformly disposed every two resource elements (REs). In contrast, in the case of Type 2, DMRSs are not uniformly disposed and DMRS REs are spaced apart at intervals of 3 REs. Accordingly, it may be preferred that a bundling size is configured small when Type 1 is used and a bundling size is configured large when Type is used.

In addition to the above-described methods, a PRB bundling size may be determined based on a system bandwidth, a partial bandwidth, an RBG size, a subband size, the size of resources actually allocated to a UE for data transmission, a UE-specific wideband and/or the size of an active BWP similar to the first embodiment. For example, if a corresponding value is within a specific range (e.g., range i), a bundling size may be configured to be determined as an xi value. In this case, xi may be defined as a specific value within a bundling size set (e.g., {1, 2, 4, 8, 16}).

Third Embodiment

Furthermore, in relation to PRB bundling, the first method and the first method may be applied as described above. In other words, a value of the PRB bundling size may be configured according to the method of selecting a specific value of pre-configured values (e.g., 1, 2, 4, 8, 16) (first method) and/or the method of setting the value of the PRB bundling size as a specific frequency allocated to a corresponding UE (e.g., the same value as a bandwidth or PRBs contiguously scheduled with respect to a corresponding UE) (second method).

In this case, the selection and application of the first method or second method may be (implicitly) determined according to the following methods. Hereinafter, the following embodiments have been distinguished for convenience of description, and some elements or characteristics of an embodiment may be included in another embodiment or may be substituted with elements or characteristics of another embodiment.

Method 1)

First, the first method or the second method may be determined based on a system bandwidth, a partial bandwidth, an RBG size, a subband size, the size of resources actually allocated to a UE for data transmission, a UE-specific wideband and/or the size of an active BWP.

For example, a configuration may be performed so that the second method is applied when a corresponding value exceeds a specific threshold value and the first method is applied if not.

Method 2)

Alternatively, the first method or the second method may be determined according to a use scenario (use case) or a communication environment. In the mmWave or indoor environment, it may be preferred that the second method is applied because the possibility that an environment not having great channel selectivity will be supported is sufficient.

Accordingly, a configuration may be performed so that a PRB bundling operation is performed according to the second method if the mmWave or indoor environment is configured and the first method is applied in the remaining environments. Alternatively, a configuration may be performed through higher layer signaling (e.g., RRC layer signaling, MAC layer signaling) so that the first method and the second method are selectively applied in the remaining environments.

Method 3)

Alternatively, a method of selecting the first method or second method based on the size of contiguous resources concatenated in the frequency axis among resources allocated to a UE and applying the selected method to PRB bundling may also be taken into consideration. That is, when resources (e.g., contiguous PRBs) contiguous on the frequency axis are allocated to the UE, the first method or second method may be selected based on the size of the corresponding contiguous resources.

For example, when the size of contiguous resources allocated to the UE is "N" or more, a PRB bundling size may be determined using the second method with respect to the corresponding resources. A PRB bundling size may be determined using the first method with respect to the remaining resources (i.e., contiguous resources having a size less than "N"). In this case, "N" may be previously defined or may be (previously) set through higher layer signaling (e.g., RRC layer signaling) or physical layer signaling by a base station.

In other words, when the size of resources contiguously allocated to a UE is greater than a pre-configured value, the bundling size of a downlink channel may be configured as the size of a frequency resource region allocated to the UE. In contrast, when the size of resources contiguously allocated to a UE is smaller than a pre-configured value, a bundling size may be configured as a value indicating a specific number of PRBs. In this case, the value indicating a specific number of PRBs may be a value included in a previously configured bundling size set according to the method.

For more detailed example, if the size of contiguous resources of resources allocated to a UE is "N" or more, the second method may be applied and the first method may be applied to the remaining allocated resources.

In this case, although the bundling size of the first method has been indicated through DCI or the bundling size has been indicated according to a specific rule, when the size of contiguous resources is "N" or more (i.e., resources having a size of "N" or more), the second method may be exceptionally applied. For example, when "N" is 4, the bundling size of the first method is 2, and resources allocated to a UE are {RB 1, RB 2, RB 3, RB 6, RB 7, RB 8, RB 9}, the first method may be applied to {RB 1, RB 2, RB 3} (i.e., bundling size=2), {RB 1, RB 2} may be bundled, and {RB 3} may be bundled. In this case, the corresponding UE may assume that all the resources are bundled by applying the second method to {RB 6, RB 7, RB 8, RB 9}.

Method 4)

Alternatively, if the size of contiguous resources of resources allocated to a UE is N or more, the corresponding UE may assume that all the resources allocated thereto are bundled for each contiguous resource group by applying the second method to all the allocated resources. For example, if allocated resources are {RB 1, RB 2, RB 3, RB 6, RB 7, RB 8, RB 9}, bundling for {RB 1, RB 2, RB 3} (i.e., contiguous allocation resource group 1) may be assumed and bundling for {RB 6, RB 7, RB 8, RB 9} (i.e., contiguous allocation resource group 2) may be assumed.

Fourth Embodiment

Furthermore, an operation method of PRB bundling may be configured (or determined) based on a resource allocation type.

For reference, in the case of the existing LTE system, a resource allocation Type 0 (hereinafter Type 0), a resource allocation Type 1 (hereinafter Type 1) and/or a resource allocation Type 2 (hereinafter Type 2) may be defined. In this case, Type 0 may mean a method of allocating resources in a PRG unit. Furthermore, Type 1 may mean a method of allocating resources in a PRB unit within a subset configured with contiguous PRGs all resources that may be allocated. Furthermore, Type 2 may mean a method of scheduling contiguous RBs by providing notification of an RB where resource allocation starts and the number of allocated PRs.

In particular, Type 2 may include a localized method and a distributed method. In this case, in the case of the distributed method, a logical RB may be mapped in a physical RB through an interleaver, and thus actually allocated RBs may be uniformly disposed in a wide frequency band.

In the NR system, in cyclic prefix (CP) OFDM-based downlink (DL)/uplink (UL), to support the Type 0 and Type 2 methods is taken into consideration. In discrete Fourier transform-spread (DFT-s) OFDM-based uplink, to support the localized method of Type 2 is taken into consideration.

In Type 0, a method of fixing and operating a bundling unit (i.e., the above-described PRG) in an RBG unit may be taken into consideration because resource allocation is performed in an RBG unit.

Alternatively, a bundling unit may be configured as a multiple of an RBG unit, and a base station may configure a multiple value with respect to a UE.

Alternatively, if the RBG unit is "N" RB or less, the RBG and the bundling unit are identically set. If not, "PRG=RBG/k" may be configured. In this case, k is an aliquot of the RBG and may be configured by a base station or fixed as a pre-defined value. The reason for this is that when the RBG unit is large, if the PRG and the RBG are identically set, precoding scheduling restrictions are increased, performance degradation occurs in an environment having great frequency selectivity, implementation complexity may increase because channel estimation of a UE is performed on many RBs at the same time.

Alternatively, a bundling unit may be configured so that the RBG unit is configured as a multiple of the bundling unit, and a base station may configure a corresponding multiple value with respect to a UE.

In Type 1, resource allocation may be performed in an RB unit, and PRGs to which resources may be allocated may have been distributed. Accordingly, a PRG does not need to be a multiple of an RBG, and "PRG=RBG" may be fixed or the PRG may be defined as "PRG=1 RB" so that it is identical with a resource allocation unit.

In the localized method of Type 2, in relation to bundling size setting, only the second method may be limited to be used. In the case of the localized method of Type 2, it may be preferred that a bundling size may be configured as all contiguous RBs (i.e., the second method) identically with a resource allocation unit because the contiguous RBs are allocated. However, the corresponding method may have a disadvantage in that a frequency selective gain is not obtained in the localized method of Type 2.

Accordingly, in the localized method of Type 2, the first method and the second method may be selectively used. In the remaining types, only the first method may be limited to be used.

In contrast, in the distributed method of Type 2, it may be preferred that a bundling size is configured as 1 RB unit because resources are allocated in a non-contiguous 1 RB unit.

Fifth Embodiment

In the case of a downlink shared channel (e.g., PDSCH) (hereinafter BC downlink shared channel) on which broadcast (BC) information (e.g., system information block (SIB), random access response (RAR), paging information) is transmitted, multiple UEs may receive data through the downlink shared channel at the same time. Accordingly, it is necessary to deliver (or configure) information on the PRB bundling of a BC downlink shared channel using a method different from that of a common unicast downlink shared channel.

In the above-described other embodiments, the method of configuring and indicating PRB bundling for a downlink shared channel for the transport of common data (or not-broadcasted data) has been described. In contrast, in the present embodiment, a method of configuring and indicating PRB bundling for a BC downlink shared channel for the transport of broadcasted data is described in detail.

In general, since a master information block (MIB) delivered through a broadcast channel (e.g., physical broadcast channel (PBCH)) includes control information received by all UEs within a cell, a method of designating a PRB bundling method (i.e., first method or second method) through the MIB or indicating a PRB bundling size may be taken into consideration. Reception probability for bundling information may be high because storing channel coding is applied to the MIB. However, to (dynamically) change bundling information may be difficult because the MIB is transmitted periodically. Alternatively, such information may be indicated in common DCI including information for decoding a BC downlink shared channel. Alternatively, in the case of a BC downlink shared channel that delivers SIB information, bundling information is delivered through the proposed method, and bundling information for the remaining BC downlink shared channels may be configured to be indicated in a SIB.

In this case, the first method and the second method related to the above-described PRB bundling provide scheduling flexibility in the unicast environment, but only one of the two methods may be sufficient with respect to the broadcast environment. The amount of control information can be reduced through such a method.

Accordingly, the bundling method of a BC downlink shared channel may be configured to be fixed to one (i.e., the first method or the second method) of the two methods.

Alternatively, the first method or the second method may be configured to be assumed by default with respect to a BC downlink shared channel before separate signaling is performed.

In view of broadcast, multiple UEs receive data in common. In this case, the channel situation (in particular, frequency selectivity) of each UE may be different. For example, a line-of-sight (LoS) UE may have low frequency selectivity.

In the case of unicast, a dynamic indication method may be used to optimize a bundling size based on the channel situation of each UE. In the case of broadcast, however, it may be difficult to set a bundling size so that it is optimized for the channel situation of each UE. Accordingly, a method of fixing a bundling size (i.e., RPB bundling size) to a specific value in the case of broadcast may be taken into consideration. That is, the BC bundling size of a downlink shared channel may be pre-defined as a specific value. Accordingly, there is an effect in that overhead of control information can be reduced.

To define the BC bundling size of a downlink shared channel as a specific value may be performed according to any one of the following methods (or a combination of them). Hereinafter, the following embodiments have been distinguished for convenience of description, and some elements or characteristics of an embodiment may be included in another embodiment or may be substituted with elements or characteristics of another embodiment.

Method 1)

First, in the case of a BC downlink shared channel, a large majority of UEs perform decoding and multiple UEs must receive data with high reliability. By taking this into consideration, it may be preferred to set small a bundling size fixed to a specific value. For example, the bundling size of a BC downlink shared channel may be configured as a small value, such as 2 (or 1).

When the bundling size is small, reliability can be improved because spatial diversity can be obtained by changing a precoder in a small RB unit. Furthermore, if only the DMRS configuration Type 1 is used in a BC downlink shared channel, a gain attributable to bundling may not be great because DMRS REs are densely disposed in the frequency axis. Furthermore, an increase in the successful number of decoding attributable to improved channel estimation accuracy may not be great because the modulation order of a BC downlink shared channel may be configured as a low modulation order, such as quadrature phase shift keying (QPSK).

Method 2)

In contrast, in order to improve channel estimation performance, the BC bundling size of a downlink shared channel may be fixed to a large value (e.g., 4). The accuracy of channel estimation can be increased because the number of DMRS REs used for channel estimation is increased as the bundling size increases. Accordingly, the corresponding method has advantages in that channel estimation for a BC downlink shared channel can be performed stably and the decoding success probability can be enhanced based on accurate channel estimation.

Method 3)

Alternatively, the bundling size of a BC downlink shared channel may be previously agreed (or defined) between a base station and a UE so that the bundling size is determined based on a specific environment or numerology. For example, in an environment using an indoor small cell or a carrier frequency of 6 GHz or more, frequency selectivity may be low because a line-of-sight (LoS) is strong and the influence of a scatter is small. In an environment having low frequency selectivity, it may be efficient to obtain a spatial diversity gain by configuring the bundling size as a small value because a gain attributable to bundling is small although the bundling size is increased. Furthermore, multiple time domain bundling may be performed within one slot using a front-load DMRS and/or an additional DMRS.

Accordingly, a method of fixing the bundling size to a small value in such an environment and fixing the bundling size to a large value in other environments may be taken into consideration.

Method 4)

Alternatively, the BC bundling size of a downlink shared channel may be agreed (or defined) between a base station and a UE so that the BC bundling size is determined based on a system bandwidth. That is, the bundling size may be configured large as a system bandwidth increases. In this case, a method of determining the bundling size by taking into consideration both the system bandwidth and the numerology may be taken into consideration.

For example, a configuration may be performed so that the bundling size is fixed to a small value in 6 GHz or more and the bundling size is determined based on a system bandwidth otherwise.

The BC bundling size of a downlink shared channel (PRB bundling size) may be pre-defined or set as a specific value through the methods.

Furthermore, various embodiments of the present invention, in relation to the bundling size of a unicast downlink shared channel, a cell-specific default bundling size, the candidates of a bundling size or a bundling method (e.g., the first method and/or the second method) may be indicated through remaining minimum system information (RMSI). Thereafter, a method of updating a bundling size or type through UE-specific signaling or selecting one of the candidates of a bundling size may also be taken into consideration.

Furthermore, in various embodiments of the present invention, in the case of a high speed scenario (in particular, when small resource allocation is performed), to set the PRG to 1 may provide a diversity gain according to precoder cycling. Furthermore, in the TDD system having downlink (DL)/uplink (UL) channel reciprocity, this can support frequency selective scheduling having single PRB granularity.

Furthermore, in various embodiments of the present invention, for dynamic switching between the first method and the second method, a 1-bit DCI field may be used. In this case, in the case of the first method, a PRG may be determined based on an RBG. In this case, when DCI payload and scheduling flexibility are taken into consideration, at least RBG may need to support {1, 2, 4}. Accordingly, if the first method is configured by the 1-bit DCI field, the PRG and the RBG may be determined identically. For example, if the RBG is greater than 4 like 8 or 16, the PRG may be determined as a maximum value (i.e., 4).

However, in the first method, if {1} is excluded as a candidate value of a PRG and only {2, 4} is supported, the above example may be changed as follows. For example, when the RBG is {2, 4}, the PRG may be the same as the RBG. When the RBG is {8, 16}, the PRG may be 4. When the RBG is {1}, the PRG may be 2. That is, if the same PRG as the RBG size is present, the PRG may be configured identically with the RBG. When the RBG is greater than a maximum value of the PRG, the PRG may be configured as a PRG maximum value. When the RBG is smaller than a minimum value of the PRG, the PRG may be configured as a PRG minimum value.

FIG. 6 illustrates an operational flowchart of a user equipment transmitting and receiving data in a wireless communication system to which a method proposed in this specification may be applied. FIG. 6 is merely for convenience of description and does not limit the scope of the present invention.

Referring to FIG. 6, a corresponding UE and a base station may perform the method (s) described in the above-described embodiments of this specification. In particular, the corresponding UE and the base station may support the methods described in the first embodiment, third embodiment and fifth embodiment. In FIG. 6, a redundant and detailed description of the above-described contents is omitted.

First, the UE may receive downlink control information (DCI) from a base station (step S605).

Thereafter, the UE may receive downlink data from the base station through a downlink shared channel configured based on the received downlink control information.

In this case, when the downlink data is broadcasted, the bundling size of the downlink shared channel may be configured as a pre-defined value (e.g., 2 PRBs).

In contrast, when the downlink data is not broadcasted, the bundling size of the downlink shared channel may be configured as a specific number of physical resource blocks or the size of a frequency resource region allocated to the UE. In this case, a value indicating the specific number of physical resource blocks may be included in a bundling size set previously configured for the downlink shared channel. In this case, when the size of the frequency resource region is greater than a value (e.g., an N value in the method 3 of the third embodiment) pre-configured for the UE, the bundling size of the downlink shared channel may be configured as the size of the frequency resource region. In this case, the frequency resource region allocated to the UE may be configured with contiguous PRBs in the frequency axis.

General Apparatus to which the Present Invention May be Applied

FIG. 7 illustrates a block diagram of a wireless communication apparatus according to an embodiment of the present invention.

Referring to FIG. 7, the wireless communication system includes an eNB (or network) 710 and a UE 720.

The eNB 710 includes a processor 711, memory 712 and a communication module 713.

The processor 711 implements the functions, processes and/or methods proposed in FIGS. 1 to 6. The layers of a wired/wireless interface protocol may be implemented by the processor 711. The memory 712 is connected to the processor 711 and stores various types of information for driving the processor 711. The communication module 713 is connected to the processor 711 and transmits and/or receives wired/wireless signals.

The communication module 713 may include a radio frequency (RF) unit for transmitting/receiving radio signals.

The UE 720 includes a processor 721, memory 722 and a communication module (or RF unit) 723. The processor 721 implements the functions, processes and/or methods proposed in FIGS. 1 to 6. The layers of a radio interface protocol may be implemented by the processor 721. The memory 722 is connected to the processor 721 and stores various types of information for driving the processor 721. The communication module 723 is connected to the processor 721 and transmits and/or receives radio signals.

The memory 712, 722 may be positioned inside or outside the processor 711, 721 and may be connected to the processor 711, 721 by various well-known means.

Furthermore, the eNB 710 and/or the UE 720 may have a single antenna or multiple antennas.

FIG. 8 illustrates a block diagram of a communication apparatus according to an embodiment of the present invention.

In particular, FIG. 8 is a diagram illustrating the UE of FIG. 7 more specifically.

Referring to FIG. 8, the UE may include a processor (or digital signal processor (DSP) 810, an RF module (or the RF unit) 835, a power management module 805, an antenna 840, a battery 855, a display 815, a keypad 820, memory 830, a subscriber identification module (SIM) card 825 (this element is optional), a speaker 845 and a microphone 850. The UE may further include a single antenna or multiple antennas.

The processor 810 implements the functions, processes and/or methods proposed in FIGS. 1 to 6. The layers of a radio interface protocol may be implemented by the processor 810.

The memory 830 is connected to the processor 810 and stores information related to an operation of the processor 810. The memory may be positioned inside or outside the processor 810 and may be connected to the processor 810 by various well-known means.

A user inputs command information, such as a telephone number, by pressing (or touching) a button of the keypad 820 or through voice activation using the microphone 850, for example. The processor 810 receives such command information and performs processing so that a proper function, such as making a phone call to the telephone number, is performed. Operational data may be extracted from the SIM card 825 or the memory. Furthermore, the processor 810 may recognize and display command information or driving information on the display 815, for convenience sake.

The RF module 835 is connected to the processor 810 and transmits and/or receives RF signals. The processor 810 delivers command information to the RF module 835 so that the RF module 835 transmits a radio signal that forms voice communication data, for example, in order to initiate communication. The RF module 835 includes a receiver and a transmitter in order to receive and transmit radio signals. The antenna 840 functions to transmit and receive radio signals. When a radio signal is received, the RF module 835 delivers the radio signal so that it is processed by the processor 810, and may convert the signal into a baseband. The processed signal may be converted into audible or readable information output through the speaker 845.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

The method of transmitting and receiving data in a wireless communication system of the present invention has been illustrated as being applied to the 3GPP LTE/LTE-A system, 5G but may be applied to various wireless communication systems.

The invention claimed is:

1. A method for transmitting and receiving data in a wireless communication system by a user equipment, the method comprising:
   receiving downlink control information from a base station, and
   receiving, from the base station, downlink data through a downlink shared channel configured based on the downlink control information,
   wherein, when the downlink data is broadcasted, a bundling size for the downlink shared channel is configured as a pre-defined value,
   wherein, when the downlink data is not broadcasted, the bundling size for the downlink shared channel is configured as a specific number of physical resource blocks or a size of a frequency resource region allocated to the user equipment, and
   wherein a value representing the specific number of physical resource blocks is included in a bundling size set pre-configured for the downlink shared channel.

2. The method of claim 1,
   wherein the pre-defined value is two physical resource blocks (PRBs).

3. The method of claim 2,
   wherein, when the downlink data is broadcasted, the downlink data comprises a system information block for the user equipment.

4. The method of claim 1,
   wherein, when the size of the frequency resource region is greater than a value pre-configured for the user equipment, the bundling size for the downlink shared channel is configured as the size of the frequency resource region.

5. The method of claim 4,
wherein the pre-configured value is configured through higher layer signaling by the base station.

6. The method of claim 4,
wherein the frequency resource region is configured as physical resource blocks contiguous in a frequency axis.

7. The method of claim 1,
wherein the pre-configured bundling size set is configured based on the size of the frequency resource region.

8. A user equipment transmitting and receiving data in a wireless communication system, comprising:
a radio frequency (RF) module for transmitting and receiving radio signals, and
a processor functionally connected to the RF module, wherein the processor is configured to:
receive downlink control information from a base station, and
receive, from a base station, downlink data through a downlink shared channel configured based on the downlink control information, and
wherein, when the downlink data is broadcasted, a bundling size for the downlink shared channel is configured as a pre-defined value,
wherein, when the downlink data is not broadcasted, the bundling size for the downlink shared channel is configured as a specific number of physical resource blocks or a size of a frequency resource region allocated to the user equipment, and
wherein a value representing the specific number of physical resource blocks is included in a bundling size set pre-configured for the downlink shared channel.

9. The user equipment of claim 8,
wherein the pre-defined value is two physical resource blocks (PRBs).

10. The user equipment of claim 8,
wherein when the size of the frequency resource region is greater than a value pre-configured for the user equipment, the bundling size for the downlink shared channel is configured as the size of the frequency resource region.

11. The user equipment of claim 10,
wherein the frequency resource region is configured as physical resource blocks contiguous in a frequency axis.

* * * * *